US012298943B2

(12) United States Patent
Munisamy et al.

(10) Patent No.: US 12,298,943 B2
(45) Date of Patent: May 13, 2025

(54) TECHNOLOGIES FOR ORGANIZING AND OPTIMIZING STORAGE CAPACITY OF SHARED FILE PLATFORMS

(71) Applicant: MCKINSEY & COMPANY, INC., New York, NY (US)

(72) Inventors: Ashok Munisamy, Somerset, NJ (US); Jaymin Jagmohan, Waldwick, NJ (US); David Kolínský, Prague (CZ); Dimitris Triantopoulos, Woodside, NY (US); Suzana Mehmedovic, New York, NY (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 18/020,901

(22) PCT Filed: Dec. 13, 2021

(86) PCT No.: PCT/US2021/063073
§ 371 (c)(1),
(2) Date: Feb. 10, 2023

(87) PCT Pub. No.: WO2023/113768
PCT Pub. Date: Jun. 22, 2023

(65) Prior Publication Data
US 2024/0303224 A1    Sep. 12, 2024

(51) Int. Cl.
*G06F 16/176*   (2019.01)
*G06F 16/16*    (2019.01)
*G06F 16/17*    (2019.01)

(52) U.S. Cl.
CPC ......... *G06F 16/176* (2019.01); *G06F 16/168* (2019.01); *G06F 16/1727* (2019.01)

(58) Field of Classification Search
CPC ... G06F 16/176; G06F 16/168; G06F 16/1727
See application file for complete search history.

(56) References Cited

U.S. PATENT DOCUMENTS 11,163,834 B2 * 11/2021 De Vansa Vikramaratne ............. G06F 16/904
2004/0199529 A1 * 10/2004 Clark ................... G06Q 10/107
(Continued)

OTHER PUBLICATIONS

Declaration of Ashok Munisamy Re Information Disclosure Statement, dated Feb. 8, 2023 (3 pages including Exhibit A).

*Primary Examiner* — Angelica Ruiz
(74) *Attorney, Agent, or Firm* — MARSHALL, GERSTEIN & BORUN LLP; Randall G. Rueth

(57) ABSTRACT

Technologies for organizing and optimizing storage capacity of shared file platforms are disclosed. An example method includes pulling a set of events associated with a user from an event log. Each event in the set of events includes a respective parent folder identification (ID). The example method further includes analyzing, by a search engine, the set of events to determine one or more actioned parent folders corresponding to the set of events; and comparing the one or more actioned parent folders to a list of parent folders associated with the user to determine a non-actioned parent folder. The example method also includes displaying, at a user interface, the non-actioned parent folder to the user; and receiving an input from the user indicating a removal request corresponding to the non-actioned parent folder. The example method may then include removing the user from a collaborator list associated with the non-actioned parent folder.

20 Claims, 5 Drawing Sheets

(56) References Cited

U.S. PATENT DOCUMENTS

| | | | |
|---|---|---|---|
| 2009/0138808 A1* | 5/2009 | Moromisato | G06Q 10/10 |
| | | | 715/758 |
| 2014/0181053 A1* | 6/2014 | Belanger | G06F 16/23 |
| | | | 707/687 |
| 2015/0347765 A1* | 12/2015 | Hankins, Jr. | H04L 63/20 |
| | | | 726/26 |
| 2016/0291856 A1* | 10/2016 | von Muhlen | H04L 67/06 |
| 2017/0048285 A1* | 2/2017 | Pearl | G06F 16/11 |
| 2017/0180476 A1* | 6/2017 | Rudrawar | G06F 16/2282 |

* cited by examiner

TECHNOLOGIES FOR ORGANIZING AND OPTIMIZING STORAGE CAPACITY OF SHARED FILE PLATFORMS

FIELD OF THE DISCLOSURE

The present disclosure generally relates to shared file platforms, and more particularly, to technologies for organizing and optimizing storage capacity of shared file platforms.

BACKGROUND

Generally speaking, most (if not all) modern companies utilize some form of document sharing through one of the many commercially available shared file platforms (e.g., SharePoint, OneDrive, etc.) (also referenced herein as "storage platforms"). These storage platforms are generally capable of storing vast amounts of information, which is generally unorganized and difficult to sort. Moreover, these storage platforms typically do not have a capability to search through the data stored for a particular user, resulting in a frustrating and generally inefficient user experience.

Additionally, when a particular user is incapable of viewing outdated and/or otherwise unnecessarily stored data, the user's computing device may suffer from a lack of available storage resources. For example, a user may be included as a contributor on hundreds (potentially thousands) of files while using a particular storage platform, and the user may download and/or otherwise store each document/file locally to the user's hard drive as the user is added to new files. As a result, the user may quickly occupy a significant amount of local storage resources (e.g., shared file platform and/or local memory) in order to maintain all/some of the files to which they have been added as a contributor. The user may also be added as a contributor to more files than the user has time to manage, such that as files become unnecessary for the user to maintain as part of their storage platform profile, the user may not recognize that the file is still included on their hard drive. These unused and/or otherwise unnecessary files may continue to accumulate until the user's computing device and/or the user's allocated storage space on the storage platform is filled, creating a bottleneck that hampers productivity and forces the user to manually manage their stored files.

Accordingly, there is a need for systems and methods for organizing and optimizing storage capacity of shared file platforms to provide increased efficiency of storage platform file management and to maximize the availability and utilization of storage resources for storing/sharing files using these storage platforms.

SUMMARY

Generally, the techniques for organizing and optimizing storage capacity of shared file platforms described herein enable a user to automatically and easily organize their files included on a shared file platform, thereby enabling the user to minimize the storage requirements necessary to store all included files as well as increase the overall usability and optimize the user experience of the shared file platform. As referenced herein, the terms "secure document" and "secure file" are utilized interchangeably herein to refer to information that is contained in a shared file platform, and the terms "shared file platform" and "storage platform" are utilized interchangeably herein to refer to software that enables multiple users to share, edit, and/or otherwise collectively view uploaded files. Moreover, for ease of discussion, an individual user's account on a shared file platform that stores and displays the user's collaborations on various files is referenced herein as a user's "platform account".

In an example application of the present techniques, a user may desire to organize their respective platform account by sorting and/or eliminating files to which the user no longer contributes and/or otherwise finds unnecessary. Utilizing the present techniques, the user may request that the contents of their platform account are sorted, and one or more processors may pull a set of events associated with the user from an event log. These events may generally correspond to user interactions with a file (e.g., edits, comments, etc.), and more particularly, user interactions with a document or single piece of data within a parent folder. Parent folders refer to folders that contain one or more documents/files that are typically related by a common theme or project.

In any event, the one or more processors may utilize a search engine to determine parent folders that have an event associated with them within a certain time period (e.g., the last 13 months), referenced herein as "actioned parent folders". The parent folders that are not actioned parent folders, referenced herein as "non-actioned parent folders," may be displayed to the user, thereby allowing the user to browse through content on the shared file platform to which they may no longer be contributing. The user may then select one or more non-actioned parent folders in order to remove their contributor status, and the present techniques may automatically interface with the shared file platform to remove the user's contributor status and/or remove data corresponding to the non-actioned parent folder from the user's local hard drive.

In accordance with the discussions herein, the present disclosure includes improvements in computer functionality at least because the disclosure describes that a system, e.g., one or more servers or computing devices, is improved in that the organization and storage of data (e.g., documents, files, etc.) stored at the servers/computing devices comprising the storage platforms is enhanced by a shared file organization application with a search engine. As is discussed elsewhere in the present disclosure, the shared file organization application, executing on the one or more servers or other computing devices, is able to quickly and efficiently organize files/documents stored on a shared file platform and remove unwanted files from storage locations (e.g., shared file platform and/or local memory). That is, the present disclosure describes improvements in the functioning of the computer itself because the one or more servers or computing devices are enhanced with a shared file organization application to optimize the data included as part of a user platform account and to maximize the storage capacity of platform and/or local computing resources, thereby allowing both the shared file platform and user computing device experience and functionality to be improved, and in particular, allowing storage and display of secure files/ documents to be improved.

For similar reasons, the present disclosure relates to improvements to other technologies or technical fields at least because the present disclosure describes or introduces improvements in the fields of shared file platform organization and data storage optimization. Namely, the shared file organization application executing on the server or other computing devices improves the fields of shared file platform organization and data storage optimization by introducing the capability to reduce data clutter and storage capacity requirements in a manner that was previously unachievable using conventional techniques. This improves over conventional techniques at least because such techniques lack the ability to automatically identify, sort, and display non-actioned parent folders for a user to view, and are otherwise simply not capable of analyzing events to determine parent folders to which a user may no longer wish to contribute.

In addition, the present disclosure includes specific features other than what is well-understood, routine, conventional activity in the field, or adding unconventional steps that confine the claim to a particular useful application, e.g., analyzing, by a search engine utilizing respective parent folder identifications (IDs), a set of events to determine one or more actioned parent folders corresponding to the set of events.

In an embodiment, a computer-implemented method for organizing and optimizing storage capacity of shared file platforms is disclosed. The method comprises pulling, by one or more processors, a set of events associated with a user from an event log, wherein each event in the set of events includes a respective parent folder identification (ID); analyzing, by a search engine utilizing the respective parent folder IDs, the set of events to determine one or more actioned parent folders corresponding to the set of events; comparing, by the one or more processors, the one or more actioned parent folders to a list of parent folders associated with the user to determine a non-actioned parent folder; displaying, at a user interface of a user computing device, the non-actioned parent folder to the user; receiving, by the one or more processors, an input from the user indicating a removal request corresponding to the non-actioned parent folder; and removing, by the one or more processors, the user from a collaborator list associated with the non-actioned parent folder.

In a variation of this embodiment, the method further comprises: analyzing, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

In another variation of this embodiment, the non-actioned parent folder comprises a set of non-actioned parent folders, and the method further comprises: automatically sorting, by the one or more processors, the set of non-actioned parent folders based on a respective most recent event associated with each respective non-actioned parent folder; and displaying, at the user interface, the sorted set of non-actioned parent folders.

In yet another variation of this embodiment, the non-actioned parent folder comprises a set of non-actioned parent folders, and the method further comprises: providing, by the one or more processors, a non-actioned folder search option configured to enable the user to search the set of non-actioned parent folders based on at least one of: (i) a non-actioned folder owner, (ii) non-actioned folder name, or (iii) a most recent event.

In still another variation of this embodiment, the method further comprises: removing, by the one or more processors, the user from the collaborator list associated with the non-actioned parent folder and the non-actioned parent folder from a hard drive of the user computing device.

In yet another variation of this embodiment, the method further comprises: receiving, by the one or more processors, a rejoin request from the user corresponding to the non-actioned parent folder; determining, by the one or more processors, whether or not the rejoin request was received within an automatic rejoin period; and responsive to determining that the rejoin request was received within the automatic rejoin period, automatically adding, by the one or more processors, the user to the collaborator list associated with the non-actioned parent folder. Further in this variation, the method further comprises: responsive to determining that the rejoin request was not received within the automatic rejoin period, generating, by the one or more processors, an owner rejoin request; automatically transmitting, by the one or more processors, the owner rejoin request to an owner of the non-actioned parent folder; receiving, by the one or more processors, a rejoin input from the owner of the non-actioned parent folder in response to the owner rejoin request; and adding, by the one or more processors, the user to the collaborator list associated with the non-actioned parent folder.

In still another variation of this embodiment, the method further comprises: determining, by the one or more processors, an owner of the non-actioned parent folder; and displaying, at the user interface, the owner of the non-actioned parent folder.

In another embodiment, a system for organizing and optimizing storage capacity of shared file platforms is disclosed. The system may include a user interface; a memory storing a set of computer-readable instructions comprising at least a search engine; and a processor interfacing with the memory, and configured to execute the set of computer-readable instructions to cause the processor to: pull a set of events associated with a user from an event log, wherein each event in the set of events includes a respective parent folder identification (ID), analyze, by the search engine utilizing the respective parent folder IDs, the set of events to determine one or more actioned parent folders corresponding to the set of events, compare the one or more actioned parent folders to a list of parent folders associated with the user to determine a non-actioned parent folder, display, at the user interface, the non-actioned parent folder to the user, receive an input from the user indicating a removal request corresponding to the non-actioned parent folder, and remove the user from a collaborator list associated with the non-actioned parent folder.

In a variation of this embodiment, the set of computer-readable instructions, when executed, further cause the processor to: analyze, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

In another variation of this embodiment, the non-actioned parent folder comprises a set of non-actioned parent folders, and the set of computer-readable instructions, when executed, further cause the processor to: automatically sort the set of non-actioned parent folders based on a respective most recent event associated with each respective non-actioned parent folder, and display, at the user interface, the sorted set of non-actioned parent folders.

In yet another variation of this embodiment, the non-actioned parent folder comprises a set of non-actioned parent folders, and the set of computer-readable instructions, when executed, further cause the processor to: provide a non-actioned folder search option configured to enable the user to search the set of non-actioned parent folders based on at least one of: (i) a non-actioned folder owner, (ii) non-actioned folder name, or (iii) a most recent event.

In still another variation of this embodiment, the set of computer-readable instructions, when executed, further cause the processor to: remove the user from the collaborator list associated with the non-actioned parent folder and the non-actioned parent folder from a hard drive of a user computing device.

In yet another variation of this embodiment, the set of computer-readable instructions, when executed, further cause the processor to: receive a rejoin request from the user corresponding to the non-actioned parent folder, determine whether or not the rejoin request was received within an automatic rejoin period, and responsive to determining that the rejoin request was received within the automatic rejoin period, automatically add the user to the collaborator list associated with the non-actioned parent folder. Further in this variation, the set of computer-readable instructions, when executed, further cause the processor to: responsive to determining that the rejoin request was not received within the automatic rejoin period, generate an owner rejoin request, automatically transmit the owner rejoin request to an owner of the non-actioned parent folder, receive a rejoin input from the owner of the non-actioned parent folder in response to the owner rejoin request, and add the user to the collaborator list associated with the non-actioned parent folder.

In an embodiment, a non-transitory computer-readable storage medium having stored thereon a set of instructions, executable by at least one processor, for organizing and optimizing storage capacity of shared file platforms is disclosed. The instructions may include instructions for pulling a set of events associated with a user from an event log, wherein each event in the set of events includes a respective parent folder identification (ID); instructions for analyzing, by a search engine utilizing the respective parent folder IDs, the set of events to determine one or more actioned parent folders corresponding to the set of events; instructions for comparing the one or more actioned parent folders to a list of parent folders associated with the user to determine a non-actioned parent folder; instructions for displaying, at a user interface of a user computing device, the non-actioned parent folder to the user; instructions for receiving an input from the user indicating a removal request corresponding to the non-actioned parent folder; and instructions for removing the user from a collaborator list associated with the non-actioned parent folder.

In a variation of this embodiment, the instructions further comprise: instructions for analyzing, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

In another variation of this embodiment, the non-actioned parent folder comprises a set of non-actioned parent folders, and the instructions further comprise: instructions for automatically sorting the set of non-actioned parent folders based on a respective most recent event associated with each respective non-actioned parent folder; and instructions for displaying, at the user interface, the sorted set of non-actioned parent folders.

In yet another variation of this embodiment, the non-actioned parent folder comprises a set of non-actioned parent folders, and the instructions further comprise: instructions for providing a non-actioned folder search option configured to enable the user to search the set of non-actioned parent folders based on at least one of: (i) a non-actioned folder owner, (ii) non-actioned folder name, or (iii) a most recent event.

In still another variation of this embodiment, the instructions further comprise:
instructions for removing the user from the collaborator list associated with the non-actioned parent folder and the non-actioned parent folder from a hard drive of the user computing device.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive and/or limiting.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

Figure 1:
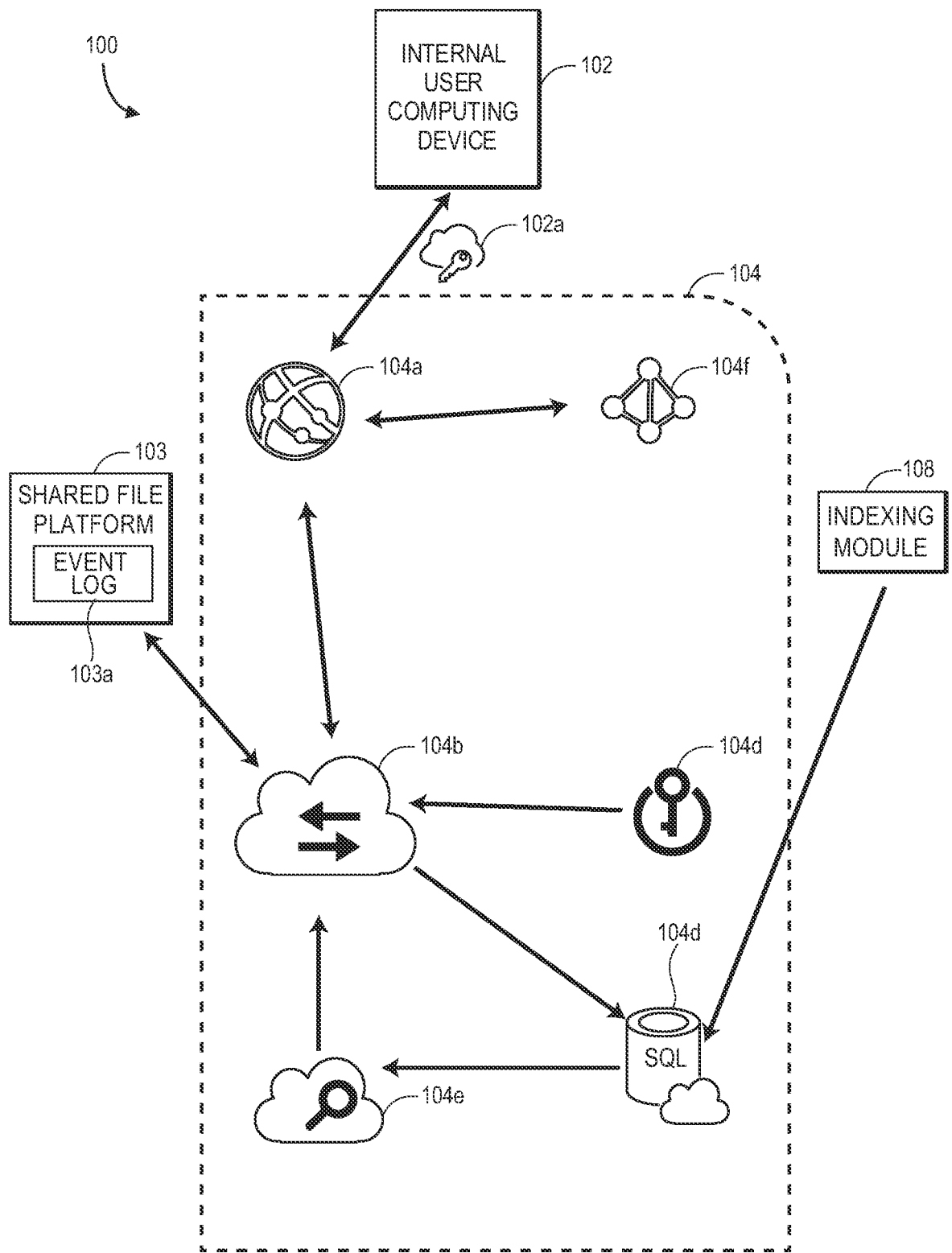
FIG. 1 illustrates an example system for organizing and optimizing storage capacity of shared file platforms, in accordance with various embodiments described herein.

FIG. 1 illustrates an example system 100 for organizing and optimizing storage capacity of shared file platforms, in accordance with various embodiments described herein. In the example embodiment of FIG. 1, the example system 100 may generally include an internal user computing device 102, a shared file platform 103, a shared file organization application 104, and an indexing module 108. Each component of the example system 100 may include one or more internal components and/or may provide one or more functionalities based on the internal components that comprise the broader components (e.g., 102, 103, 104, 108). Collectively, though, these components receive requests from an internal user to organize their respective platform account and enable the user to search their associated files and/or remove their collaboration status from their platform account (and corresponding files from their hard drive). More specifically, much of the communication between the internal user computing device 102 and the shared file platform 103 may be controlled by the shared file organization application 104, which may generally pull the sets of events, analyze the events, and remove the collaborations and/or files from a user's platform account and/or hard drive. As referenced herein, an "internal user" generally refers to a user that has valid access credentials to access a shared file platform, and may also be referenced herein as a "user".

The internal user computing device 102 may generally refer to a computing device utilized by an internal user who has access credentials sufficient to access the shared file platform 103. The internal user may accomplish this through use of the internal user computing device 102 that transmits secure communications 102a to the shared file organization application 104. Additionally, or alternatively, the internal user computing device 102 may have direct access to a company managed and/or otherwise shared file platform 103, and may enable an internal user to upload, modify, and/or otherwise manage files stored on the shared file platform 103. The internal user computing device 102 may also enable the internal user to generate requests to organize and optimize their respective platform account on the shared file platform 103. More specifically, the internal user may utilize the internal user computing device 102 to generate these requests through the shared file organization application 104, as described further herein. The secure communications 102a may be transmitted in both directions through the use of access keys generated and stored on the shared file organization application 104, as described herein.

In certain aspects, the internal user computing device 102 may comprise mobile devices and/or client devices for accessing and/or communicating with the shared file organization application 104. In various embodiments, the internal user computing device 102 may comprise a desktop computer, a laptop computer, a cellular phone, a mobile phone, a tablet device, a personal data assistance (PDA), or the like, including, by non-limiting example, an APPLE iPhone or iPad device or a GOOGLE ANDROID based mobile phone or table. In addition, the internal user computing device 102 may implement or execute an operating system (OS) or mobile platform such as Apple's iOS and/or Google's Android operation system. The internal user computing device 102 may additionally comprise one or more processors and/or one or more memories for storing, implementing, or executing computing instructions or code, e.g., a mobile application, as described in various embodiments herein.

Moreover, the internal user computing device 102 may comprise a wireless transceiver to receive and transmit communications (e.g., secure communications 102a) to and/or from the shared file organization application 104. In addition, the internal user computing device 102 may include a display screen for displaying secure files, file collaboration statuses, file descriptions/information, graphics, images, text, data, pixels, features, and/or other such visualizations or information as described herein. In various embodiments, secure files, file collaboration statuses, file descriptions/information, graphics, images, text, data, pixels, features, and/or other such visualizations or information may be received from the shared file organization application 104 for display on the display screen of the internal user computing device 102. Additionally, or alternatively, the internal user computing device 102 may comprise, implement, have access to, render, or otherwise expose, at least in part, an interface or a graphical user interface (GUI) for displaying text and/or images on its display screen, as described further herein.

In any event, the shared file organization application 104 includes a web application 104a, a web application programming interface (API) 104b, an event query database 104c, a key vault 104d, a search engine 104e, and an active directory 104f. It should be understood that each of 104a-f may be and/or comprise computing instructions, and for ease of discussion, may be referenced herein as "components" of the shared file organization application 104. Generally, the shared file organization application 104 represents the components of the example system 100 that enable an internal user to organize and optimize their respective platform account on the shared file platform 103. For example, the shared file organization application 104 serves as the application through which an internal user may view and/or edit non-actioned parent folders, to remove their collaborator status, search parent folders, and/or otherwise organize their platform account and optimize the storage capacity of the platform 103 and the internal user computing device 102.

The web application 104a may be an external facing component of the shared file organization application 104, in that, the internal user may interact with and/or otherwise provide inputs to the shared file organization application 104 through the web application 104a executing on the internal user computing device 102. The web application 104a may also receive/transmit the secure communications 102a to/from the internal user computing device 102, and may validate the internal user's access credentials using the active directory 104f, which may maintain a listing of all internal users and/or users with valid access credentials in order to access the shared file organization application 104. Moreover, the active directory 104f may include single sign-on (SSO) and/or multi-factor authentication (MFA) functionality, and may provide secure access for internal users through the internal user computing device 102. In any event, if the web application 104a receives a valid (e.g., authorized) secure communication 102a from the internal user computing device 102, the web application 104a may transmit the communication 102a to the web API 104b.

The web API 104b may generally direct communications between components of the shared file organization application 104, the shared file platform 103, and/or the indexing module 108. For example, a secure communication 102a from the internal user computing device 102 may require information to be retrieved from and/or otherwise communicated to the shared file platform 103. The web API 104b may automatically transmit the relevant portion of the secure communication 102a to the shared file platform 103 in order to retrieve and/or otherwise communicate the necessary information in order to accomplish the task included as part of the secure communication 102a. As another example, the web API 104b may receive an access key as part of a secure communication 102a that requires validation by checking the key vault 104d for matching access keys. The web API 104b may automatically, upon receipt of the secure communication 102a, pull the access keys or a matching access key stored in the key vault 104*d* and transmit the results to the web app 104*a* or any other suitable component to determine whether or not the access key included in the secure communication 102*a* is valid.

As such, when an internal user generates a request to organize and optimize their respective platform account, the web API 104*b* may receive the request, and may pull a set of events from an event log 103*a* of the shared file platform 103. The web API 104*b* may also transmit the set of events to the event query database 104*c* and/or the indexing module 108, where the set of events may be indexed and/or otherwise categorized relative to the parent folders included in the internal user's platform account. As previously mentioned, events may generally correspond to user interactions with a file (e.g., edits, comments, etc.), and more particularly, user interactions with a document or single piece of data within a parent folder. Each event may include a parent folder identification (ID) indicating a parent folder in which the event took place. For example, an event with a parent folder ID indicating a first parent folder may represent that the event took place with respect to a document or file contained within the first parent folder.

Thus, as an example, the indexing module 108 may receive a first set of events that correspond to all events performed by all users (e.g., internal users) of the shared file platform as input, and may output a second set of events that correspond specifically to the internal user. The indexing module 108 may analyze each event included in the first set of events, and may identify each event that includes a parent folder ID corresponding to a parent folder where the internal user is listed as an owner, contributor and/or the parent folder is otherwise stored on the internal user's platform account. When each of these events have been extracted from the first set of events, the indexing module 108 may transmit the second set of events to the event query database 104*c* for storage and/or further analysis by the search engine 104*e*. In certain aspects, the set of events may only include events that occurred within a certain time threshold (e.g., 13 months) from the date of the internal user's request.

Regardless, when the indexing module 108 has indexed a set of events corresponding to the internal user that submitted an organization and optimization request, the module 108 may transmit the set of events to the event query database 104*c* for storage until/while the search engine 104*e* analyzes the set of events. In particular, the search engine 104*e* may analyze each event in the set of events to determine which parent folders included in the internal user's platform account are associated with a recent event (the "actioned parent folders"), and thereby may be a parent folder the internal user may desire to maintain contributor status and/or otherwise continue to include in their respective platform account. Of course, the recent event may be determined and/or otherwise established based on a time threshold that delineates between recent and non-recent events relative to the date/time of the internal user's request to organize and optimize their platform account.

When the search engine 104*e* has determined the actioned parent folders, the search engine 104 may accordingly identify the non-actioned parent folders as the set of parent folders included on the internal user's platform account that does not include any actioned parent folders. The search engine 104*e* may then transmit an indication of the non-actioned parent folders to the web API 104*b*, which may forward the indication to the web application 104*a* for viewing by an internal user at the internal user computing device 102. The internal user may evaluate each non-actioned parent folder to determine whether or not the non-actioned parent folder should be maintained as part of the internal user's platform account, and may input removal requests corresponding to individual non-actioned parent folders through the internal user computing device 102.

If the internal user inputs a removal request for a particular non-actioned parent folder, the web API 104*b* may receive this removal request, and may transmit the request to the shared file platform 103. The request may cause the shared file platform 103 to remove the non-actioned parent folder from the internal user's respective platform account (e.g., remove owner/collaborator/etc. status), along with any corresponding documents/files stored on the shared file platform 103. Moreover, in certain aspects, the web API 104*b* may also transmit a signal to remove documents/files corresponding to the removed non-actioned parent folder from the memory of the internal user computing device 102.

As previously mentioned, the shared file organization application 104 may enable an internal user to organize and optimize their respective platform account on the shared file platform 103. Broadly speaking, the shared file organization application 104 may be hosted on one or more computer servers. In various embodiments, shared file organization application 104 may be hosted on multiple servers, which may comprise a multiple, redundant, or replicated servers as part of a server farm. Further, the shared file organization application 104 may be implemented on cloud-based servers, such as a cloud-based computing platform. For example, shared file organization application 104 may be hosted on any one or more cloud-based platform(s) such as MICROSOFT AZURE, or the like. The platform hosting, storing, and/or otherwise including the shared file organization application 104 may include one or more processor(s) (not shown) as well as one or more computer memories (not shown).

Figure 2A:
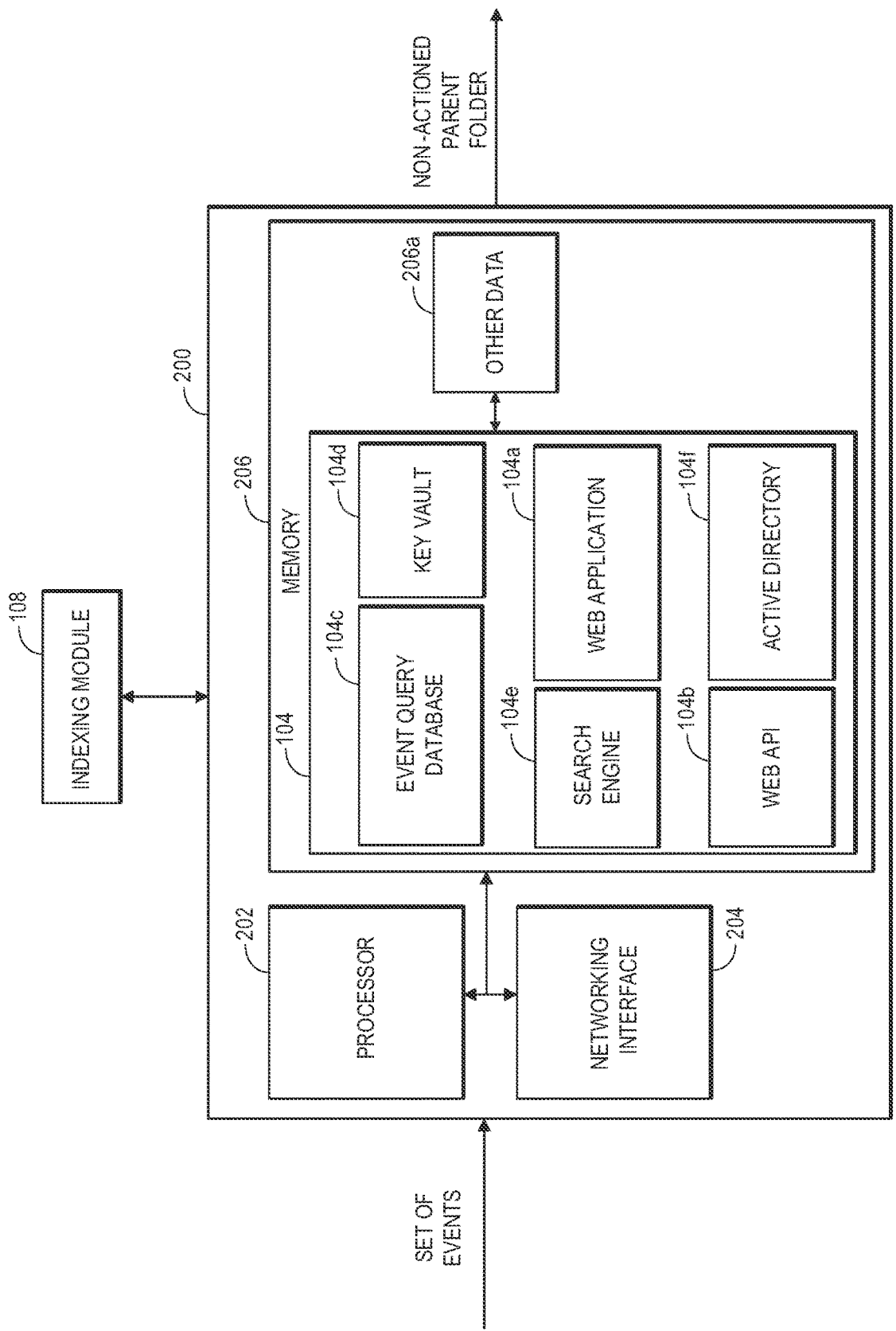
FIG. 2A illustrates an example workflow for generating a non-actioned parent folder utilizing a portion of the example system of FIG. 1, in accordance with various embodiments described herein.

In particular, as illustrated in FIG. 2A, the shared file organization application 104 may be hosted and/or otherwise stored on a hosting platform 200 that additionally includes one or more processors 202, a networking interface 204, and one or more memories 206. FIG. 2A generally illustrates an example workflow for generating a non-actioned parent folder utilizing the shared file organization application 104 of the example system 100 of FIG. 1. An internal user may submit a request (e.g., by the internal user computing device 102*a*) to organize and optimize their respective platform account, which may be received at the hosting platform 200, and may be interpreted by the one or more processors 202 utilizing one or more components of the shared file organization application 104. In particular, the one or more processors 202 may then utilize the web API 104*b* to retrieve the set of events from an event log (e.g., event log 103*a*) of a shared file platform (e.g., shared file platform 103).

The web API 104*b* may transmit the set of events to the indexing module 108 for indexing/categorization relative to the internal user, such that the indexing module 108 outputs and returns to the event query database 104*c* a set of events associated with the internal user, as previously described. The search engine 104*e* may then analyze the set of events associated with the internal user to determine which parent folders do not include an event that occurred within a time period threshold. As a result of this analysis, the search engine 104*e* may determine that a parent folder included as part of the internal user's account profile does not include at least one event that occurred within the time period threshold. For example, assume that the time period threshold is 13 months, and that a first parent folder included as part of the internal user's account profile has a most recent event that occurred two years prior to the date of the internal user's request to organize and optimize their respective account profile. In this example, the search engine 104e may determine that the first parent folder is a non-actioned parent folder because the most recent event corresponding to the first parent folder did not occur within the time period threshold since the internal user submitted their request to organize and optimize their respective account profile.

As another example, assume that the time period threshold is again 13 months, and that a second parent folder included as part of the internal user's account profile has a most recent event that occurred ten weeks prior to the date of the internal user's request to organize and optimize their respective account profile. In this example, the search engine 104e may determine that the second parent folder is an actioned parent folder because the most recent event corresponding to the second parent folder did occur within the time period threshold since the internal user submitted their request to organize and optimize their respective account profile.

In any event, when the search engine 104e determines that a parent folder qualifies as either actioned or non-actioned, the search engine 104e may assign the parent folder to the appropriate classification, and may continue analyzing parent folders in this manner until the search engine 104e has analyzed all parent folders included as part of the internal user's account profile. When the search engine 104e has analyzed all of the internal user's parent folders, the search engine 104e may output a signal indicating the non-actioned parent folder for viewing by the internal user (e.g., by the internal user computing device 102). Of course, it should be understood, that the signal indicating the non-actioned parent folder may include one or more non-actioned parent folders.

When the user analyzes the signal indicating the non-actioned parent folder, the user may decide that one or more of the non-actioned parent folders are no longer necessary to maintain on their respective account platform, and may submit a removal request. For example, FIG. 2B illustrates an example workflow for removing a user from a collaborator list of a non-actioned parent folder and/or removing the non-actioned parent folder from a storage device utilizing the shared file organization application 104 of the example system 100 of FIG. 1.

Figure 2B:
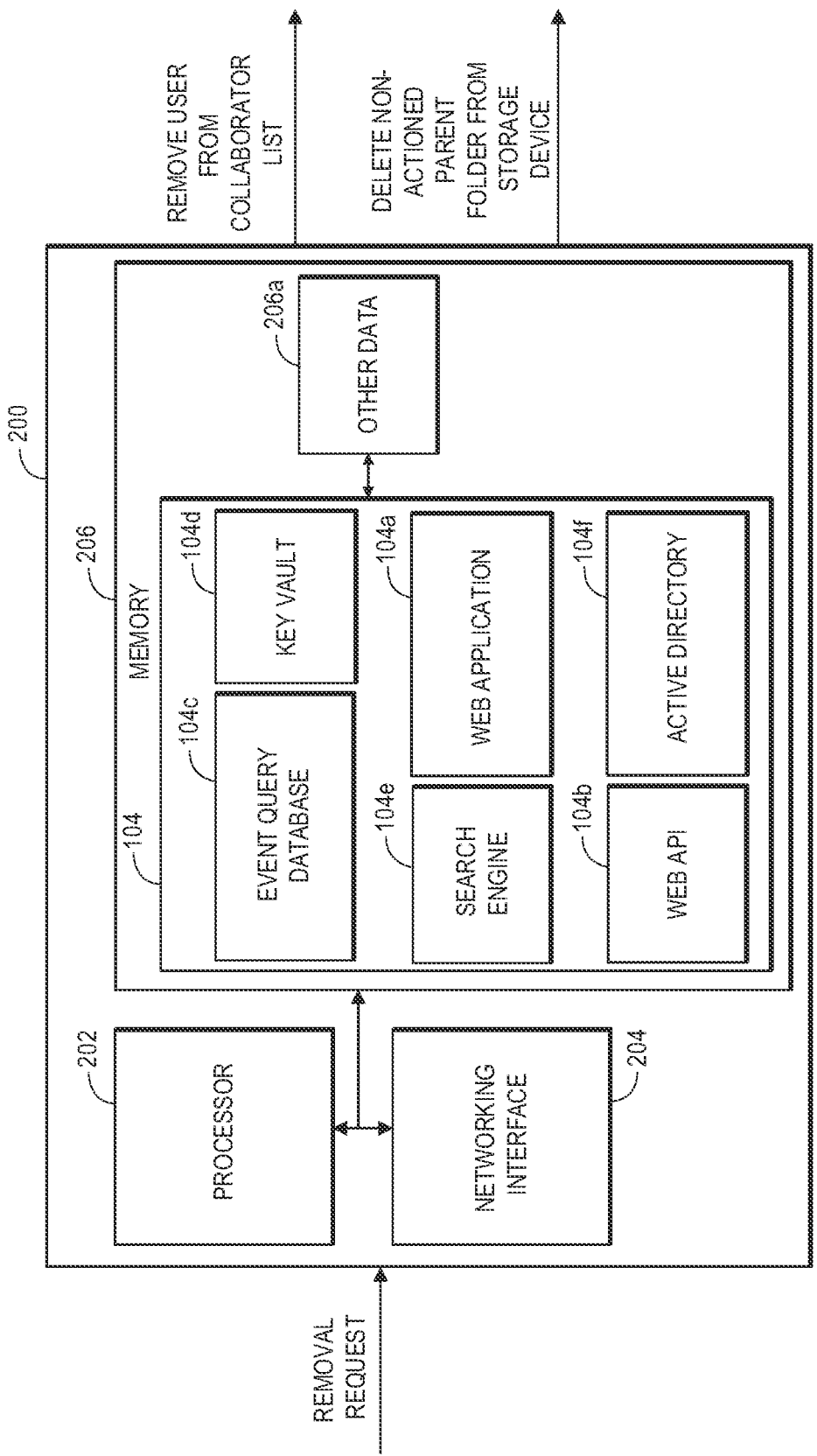
FIG. 2B illustrates an example workflow for removing a user from a collaborator list of a non-actioned parent folder and/or removing the non-actioned parent folder from a storage device by utilizing a portion of the example system of FIG. 1, in accordance with various embodiments described herein.

As illustrated in FIG. 2B, the hosting platform 200 may receive a removal request from an internal user. The internal user may provide the removal request through an internal user computing device (e.g., internal user computing device 102) that received and/or otherwise has access to the signal indicating the non-actioned parent folder. The web API 104b may interpret and transmit the removal request to multiple locations to accomplish multiple tasks. Namely, in response to receiving the removal request, the web API 104b may transmit a collaboration removal signal to the shared file platform 103 instructing the shared file platform to remove the internal user from the collaborator list associated with the non-actioned parent folder. More generally, this collaboration removal signal may instruct the shared file platform to remove the internal user from any list maintained by the shared file platform 103 indicating the internal user as a collaborator, owner, viewer, and/or any type of contributor corresponding to the non-actioned parent folder. As such, when the shared file platform processes the collaboration removal signal and removes the internal user from the appropriate list, the internal user should be unable to view the parent folder or the contents contained therein.

Additionally, the web API 104b may transmit a deletion signal to the shared file platform 103 to delete the non-actioned parent folder and/or any contents contained therein (e.g., individual documents, files, etc.) from the storage allocated to the internal user on the shared file platform 103. In certain aspects, the web API 104b may also transmit a deletion signal to the internal user's computing device (e.g., internal user computing device 102) to delete the non-actioned parent folder and/or any contents contained therein from the storage on the internal user's computing device. For example, the internal user may download and locally store a parent folder that includes multiple files and documents when the parent folder is initially shared with the internal user. Over time, as the parent folder is accessed less by the internal user, the parent folder may become a non-actioned parent folder that the internal user includes as part of a removal request. In this example, the web API 104b may transmit the deletion signal to the internal user's computing device, which may locate the parent folder stored in the memory of the internal user's computing device, and the device may automatically delete the non-actioned parent folder and all of its contents.

More generally, the one or more processors 202 may be connected to the one or more memories 206 via a computer bus responsible for transmitting electronic data, data packets, or otherwise electronic signals to and from the one or more processors 202 and the one or more memories 206 in order to implement or perform the machine readable instructions, methods, processes, elements or limitations, as illustrated, depicted, or described for the various flowcharts, illustrations, diagrams, figures, and/or other disclosure herein.

The one or more processors 202 may interface with the one or more memories 206 via the computer bus to execute an operating system (OS). The one or more processors 202 may also interface with the one or more memories 206 via the computer bus to create, read, update, delete, or otherwise access or interact with the data stored in the one or more memories 206. The data stored in the one or more memories 206 may include all or part of any of the data or information described herein, including, for example, the shared file organization application 104, other data 206a, and/or any other data stored in the one or more memories 206.

The hosting platform 200 may further include a networking interface 204 configured to communicate (e.g., send and receive) data via one or more external/network port(s) to one or more networks or local terminals, such as a computer network and/or user computing devices (e.g., internal user computing device 102) described herein. In some embodiments, the hosting platform 200 may include a client-server platform technology such as ASP.NET, Java J2EE, Ruby on Rails, Node.js, a web service or online API, responsive for receiving and responding to electronic requests. The hosting platform 200 may implement the client-server platform technology that may interact, via the computer bus, with the one or more memories 206 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein. According to some embodiments, the hosting platform 200 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network. In some embodiments, the computer network may comprise a private network or local area network (LAN). Additionally, or alternatively, the computer network may comprise a public network such as the Internet.

The hosting platform 200 may further include or implement an operator interface configured to present information to an administrator or operator and/or receive inputs from the administrator or operator. For example, an operator interface may provide a display screen (e.g., via internal user computing device 102a). The hosting platform 200 may also provide I/O components (e.g., ports, capacitive or resistive touch sensitive input panels, keys, buttons, lights, LEDs), which may be directly accessible via or attached to the hosting platform 200 or may be indirectly accessible via or attached to an internal user computing device (e.g., 102). According to some embodiments, an administrator or operator may access the hosting platform 200 by the internal user computing device 102 to review information (e.g., non-actioned parent folders), make changes, search non-actioned and/or actioned parent folders, and/or perform other functions.

As described above herein, in some embodiments, the hosting platform 200 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the shared file organization application 104, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 202 (e.g., working in connection with the data in the one or more memories 206) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The one or more memories 206 may include one or more forms of non-transitory, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In certain aspects, the one or more memories 206 may store an operating system (OS) (e.g., Microsoft Windows, Linux, Unix, etc.) capable of facilitating the functionalities, applications, methods, or other software as discussed herein.

The one or more memories 206 may also store the shared file organization application 104, as well as other data 206a, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of the shared file organization application 104, where each may be configured to facilitate their various functionalities discussed herein. It should be appreciated that one or more other applications may be envisioned and that are executed by the one or more processors 202.

Figure 3:
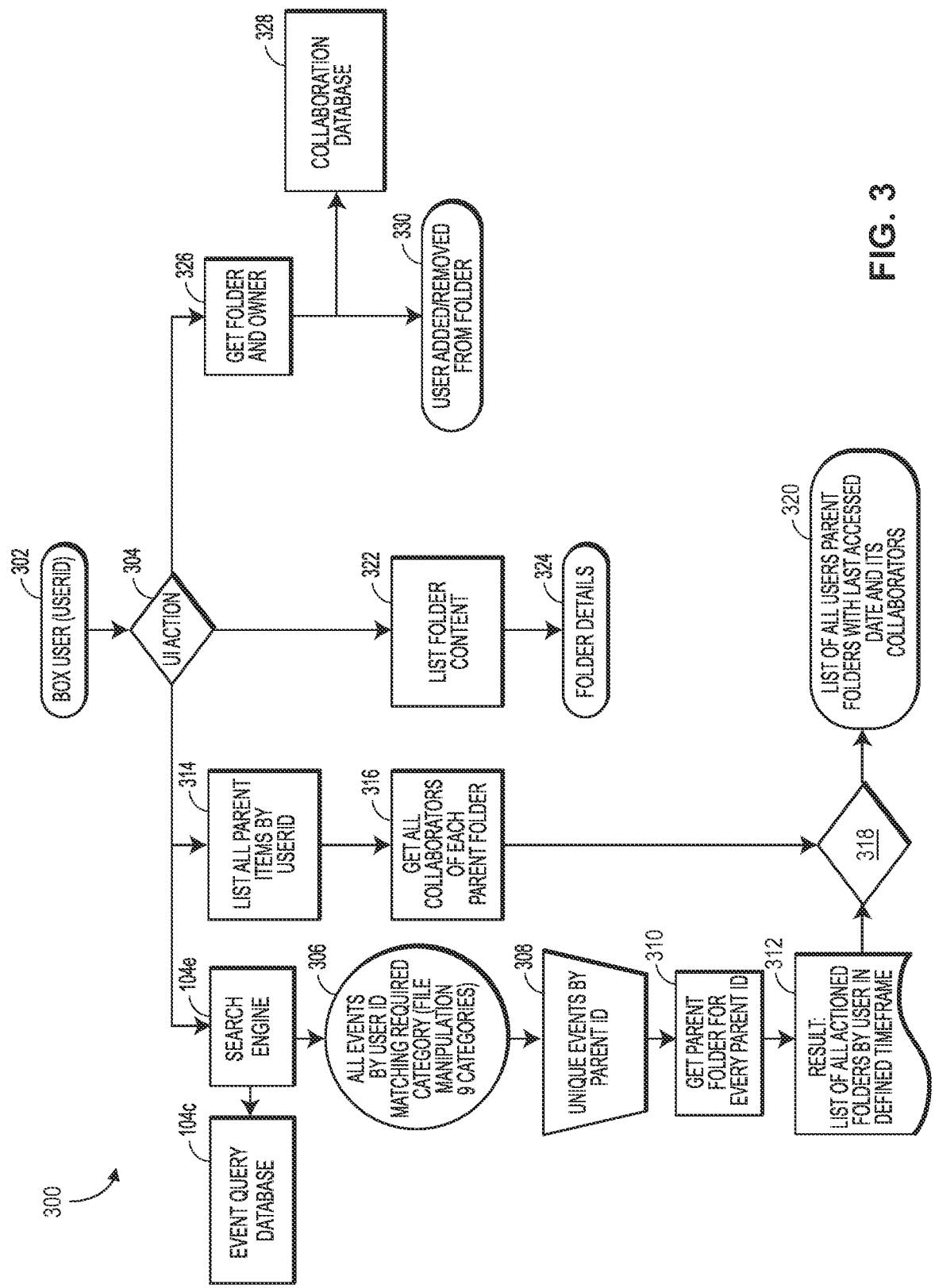
FIG. 3 is an example workflow for organizing and optimizing storage capacity of shared file platforms, in accordance with various embodiments described herein.

FIG. 3 is an example workflow 300 for organizing and optimizing storage capacity of shared file platforms, in accordance with various embodiments described herein. The example workflow 300 begins with an internal user 302 providing an input 304. Generally, the input 304 may correspond to multiple actions included as part of the processes described herein, such as a request to organize and optimize the internal user's 302 respective platform account, a removal request, and/or any other suitable input.

Regardless, when the input 304 corresponds to a request to organize and optimize the internal user's respective platform account, the workflow 300 may proceed through an initial loading stage, that includes functions performed by the search engine 104e in combination with the event query database 104c. At block 306, the search engine 104e may analyze all events that are associated with the internal user's 302 user ID, as provided, for example, by an indexing module (e.g., indexing module 108) in order to evaluate which events are included as part of a set of categories that determine whether or not a particular parent folder qualifies as an actioned parent folder. For example, there may be 9 categories of events that enable the search engine 104e to make the actioned/non-actioned determination, and may include categorizations such as file editing, file saving, file sharing, and/or other suitable file manipulation types. The search engine 104e may evaluate each event utilizing these categories to determine which set of events should be considered when determining unique events for parent folders at block 308.

Moreover, each event included in the list may, by default, be within a specified time period threshold from the date/time of the internal user's 302 request (e.g., input 304), such that all corresponding parent folders may be actioned parent folders. Of course, in certain aspects, the indexing module 108 and/or other suitable component may provide the search engine 104e with events that occurred from any timeframe, and the search engine 104e may be configured to apply a time period threshold in order to eliminate certain events that fail to satisfy the time period threshold.

Regardless, at block 308, the search engine 104e may determine sets of unique events for each parent folder included as part of the internal user's 302 platform account, and may determine the associated parent folder IDs indicated by the events. With these sets of unique events and the parent folder IDs, the search engine 104e may then retrieve the parent folders at block 310, and as a result, at block 312, the search engine 104e may compile a complete list of actioned parent folders corresponding to the internal user 302 during the time period threshold since the internal user's 302 request to organize and optimize the internal user's respective platform account.

As a parallel function, the application (e.g., shared file organization application 104) may generate a list of all parent folders corresponding to the internal user's 302 ID (block 314). The application 104 may then retrieve a list of all collaborators for all parent folders included on the list of all parent folders at block 316. Accordingly, the shared file organization application 104 may compare the list of all collaborators with the list of actioned parent folders at block 318 to generate a list of all parent folders corresponding to the internal user 302 at block 320. This list of all parent folders corresponding to the internal user 302 may include a last accessed date for each parent folder, and may also include the list of collaborators for each parent folder. Using this list of all parent folders corresponding to the internal user 302, the shared file organization application 104 may enable the internal user 302 to determine which parent folders (e.g., non-actioned parent folders) should be removed from the internal user's 302 platform account, which parent folders should be re-organized (e.g., actioned parent folders) to be more accessible and/or otherwise prioritized on the internal user's 302 platform account, and/or any other suitable determination.

The shared file organization application 104 may then present the list of all parent folders corresponding to the internal user 302 for viewing by the internal user 302, and the internal user 302 may provide various inputs in response. For example, the internal user 302 may request to view details of the parent folders, so that the internal user 302 may make a more informed decision corresponding whether to remove the parent folder, re-organize the parent folder, and/or otherwise modify the parent folder. In response, the application 104 and/or the shared file platform 103 may display the contents of the parent folder at block 322, which may include various folder details 324 such as a number of files/documents, size of files/documents (e.g., in storage capacity requirements), number of collaborators, last access dates for each file/document, and/or any other suitable contents or combinations thereof.

Further, the folder details 324 may include additional information corresponding to why a particular parent folder may have been designated as an actioned parent folder and/or a non-actioned parent folder. For example, the folder details 324 may include and/or highlight that a non-actioned parent folder was shared with the internal user 302 by a senior partner or high-level executive, such that the internal user 302 may not desire to remove the non-actioned folder despite not interacting with the folder or its contents for longer than the time period threshold.

Additionally, the shared file organization application 104 may provide the internal user 302 with the opportunity to search through parent folders by various criteria, such as an owner, a collaborator, a file name, etc. The internal user 302 may determine which parent folders a particular owner has shared with them to make sure they are maintained or deleted, which parent folders should be maintained as part of their respective platform account because they include a particular collaborator, and/or any other similar conclusions based on the chosen search criteria. More specifically, the shared file organization application 104 may enable the internal user 302 to search in this manner using object manipulation, such as JavaScript Object Notation (JSON) manipulation, of the folders and/or the folder contents in order to create a nearly instantaneous searching experience for the internal user 302. As a result of viewing and/or searching the folder details 324, the internal user 302 may establish a fuller understanding of what types of parent folders are included within the internal user's 302 platform account, and which parent folders should be removed, re-organized, and/or otherwise modified based on the activity levels the internal user 302 has with each parent folder and any other criteria the internal user 302 deems relevant.

When the internal user 302 makes a decision to remove a particular parent folder from their respective platform account, the internal user 302 may provide a subsequent input 304 in the form of a removal request. The shared file organization application 104 may retrieve the parent folder and the name of the owner of the parent folder at block 326. The application 104 may then access a collaboration database 328 and remove the internal user's 302 name from the list corresponding to the parent folder. As a result, at block 330 the application 104 may remove the parent folder from the internal user's platform account, such that when the internal user 302 subsequently accesses their platform account, the removed parent folder (as well as all documents/files contained therein) may not be accessible or viewable from the internal user's platform account. Further, the application 104 may transmit a notification to the owner of the parent folder indicating that the internal user 302 has removed themselves from the collaborator list of the parent folder.

Accordingly, if the internal user 302 decides at a later point that removing themselves from the collaborator list of the parent folder was erroneous, the internal user 302 may provide an input 304 in the form of a rejoin request to rejoin the collaborator list of the parent folder. Such a rejoin request may cause the shared file organization application 104 to determine whether or not the internal user 302 submitted the rejoin request within an automatic rejoin period. If the shared file organization application 104 determines that the internal user 302 submitted the rejoin request within the automatic rejoin period, then the application 104 may automatically add the internal user's 302 name to the list of collaborators for the parent folder. However, if the shared file organization application 104 determines that the internal user 302 did not submit the rejoin request within the automatic rejoin period, then the application 104 may transmit an owner rejoin request to the owner of the parent folder. In certain instances, the owner rejoin request may be an email message to the owner of the parent folder that is automatically generated and transmitted by the shared file organization application 104, and the message may contain a button that, when pressed by the owner, instructs the application 104 to seamlessly add the internal user's 302 name back to the list of collaborators for the parent folder. However, in general, the shared file organization application 104 may notify the owner of the parent folder whenever a user removes themselves from the collaborator list and/or adds themselves to the collaborator list of the owner's parent folder.

Figure 4:
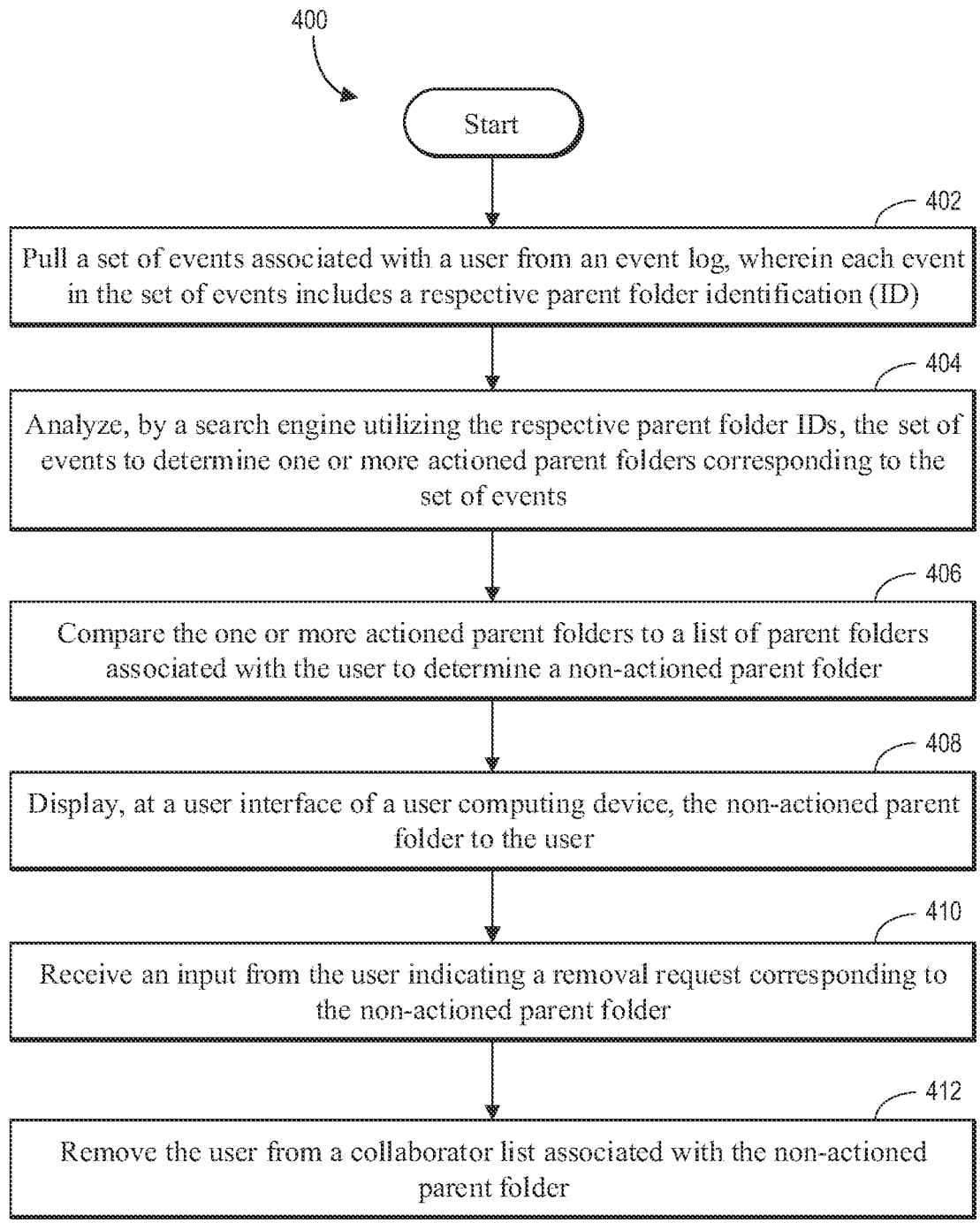
FIG. 4 illustrates an example method for organizing and optimizing storage capacity of shared file platforms, in accordance with various embodiments described herein.

FIG. 4 illustrates an example method for organizing and optimizing storage capacity of shared file platforms, in accordance with various embodiments described herein. At least portions of the method 400 may be performed by one or more processors (e.g., one or more processors 202) utilizing the embodiments of the internal user computing device 102, the shared file platform 103, and/or the shared file organization application 104 of FIG. 1, for example, or by other suitable modules or systems. In embodiments, the method 400 may include additional or alternate steps other than those described herein.

The method 400 may include pulling, by one or more processors, a set of events associated with a user from an event log (block 402). Each event in the set of events may include a respective parent folder identification (ID). The method 400 may also include analyzing, by a search engine utilizing the respective parent folder IDs, the set of events to determine one or more actioned parent folders corresponding to the set of events (block 404).

In certain aspects, the method 400 may also include analyzing, by the search engine utilizing the respective parent folder IDs, the set of events at a first time to determine one or more actioned parent folders corresponding to the set of events. In these aspects, each actioned parent folder of the one or more actioned parent folders may correspond to an event that occurred within 13 months of the first time. For example, the search engine may analyze each event of the set of events and determine that a first event that occurred within 4 months of the first time (e.g., the date/time when the internal user input the request to organize and optimize their respective platform account) includes a first parent folder ID, and that a second event that occurred within 8 months of the first time includes a second parent folder ID. In this example, the search engine may determine that both a first parent folder associated with the first parent folder ID and a second parent folder associated with the second parent folder ID may be actioned parent folders because the events corresponding to the first and second parent folders occurred within the time period threshold (e.g., within 13 months of the first time).

The method 400 may also include comparing, by the one or more processors, the one or more actioned parent folders to a list of parent folders associated with the user to determine a non-actioned parent folder (block 406). In certain aspects, the non-actioned parent folder may comprise a set of non-actioned parent folders, and the method 400 may further include automatically sorting, by the one or more processors, the set of non-actioned parent folders based on a respective most recent event associated with each respective non-actioned parent folder. Further in these aspects, the method 400 may include displaying, at a user interface (e.g., of the internal user computing device 102), the sorted set of non-actioned parent folders.

The method 400 may also include displaying, at a user interface of a user computing device (e.g., internal user computing device 102), the non-actioned parent folder to the user (block 408). In certain aspects, the non-actioned parent folder comprises a set of non-actioned parent folders, and the method 400 may further include providing, by the one or more processors, a non-actioned folder search option configured to enable the user to search the set of non-actioned parent folders based on at least one of: (i) a non-actioned folder owner, (ii) non-actioned folder name, or (iii) a most recent event.

In some aspects, the method 400 may also include determining, by the one or more processors, an owner of the non-actioned parent folder. Further, the shared file organization application may display, at a user interface (e.g., of the internal user computing device 102), the owner of the non-actioned parent folder. In this manner, the internal user may understand who has shared and/or who owns the non-actioned parent folder, and may accordingly make a determination whether or not to remove the non-actioned parent folder based on this additional information.

The method 400 may also include receiving, by the one or more processors, an input from the user indicating a removal request corresponding to the non-actioned parent folder (block 410). When the shared file organization application receives the input indicating the removal request, the method 400 may further include removing, by the one or more processors, the user from a collaborator list associated with the non-actioned parent folder (block 412).

In certain aspects, the method 400 may also include removing, by the one or more processors, the user from the collaborator list associated with the non-actioned parent folder and the non-actioned parent folder from a hard drive of the user computing device. Moreover, as previously mentioned, the application may remove the parent folder and any/all corresponding contents from either the internal user's computing device and/or the shared file platform's allocated storage space for the internal user that, in part, defines the internal user's platform account.

In some aspects, the method 400 may also include receiving, by the one or more processors, a rejoin request from the user corresponding to the non-actioned parent folder. Further in these aspects, the method 400 may include determining, by the one or more processors, whether or not the rejoin request was received within an automatic rejoin period. Responsive to determining that the rejoin request was received within the automatic rejoin period, the one or more processors may automatically add the user to the collaborator list associated with the non-actioned parent folder.

However, in certain aspects, and responsive to determining that the rejoin request was not received within the automatic rejoin period, the method 400 may include generating, by the one or more processors, an owner rejoin request. Further in these aspects, the method 400 may also include automatically transmitting, by the one or more processors, the owner rejoin request to an owner of the non-actioned parent folder. The method 400 may also include receiving, by the one or more processors, a rejoin input from the owner of the non-actioned parent folder in response to the owner rejoin request; and adding, by the one or more processors, the user to the collaborator list associated with the non-actioned parent folder.

Thus, in view of the above, the novel systems, methods, and techniques disclosed herein reduce data clutter, optimize storage capacity, and provide a vastly improved overall shared file platform user experience and ease-of-access, by automatically analyzing, presenting, and removing a user from non-actioned parent folders. For example, the methods more efficiently store secure files when compared to conventional methods/techniques by automatically identifying non-actioned parent folders and removing the contents from valuable storage space, thereby generally increasing the available storage space on both the shared file platform as well as the user's computing device. Without the automatic non-actioned parent folder determination and presentation of the present techniques, each internal user may have to manually manage their extensive list of shared files, such that regular organization and optimization of their respective platform accounts may be reduced/eliminated until their allocated storage capacity is reached. Moreover, without the searching and automatic rejoin functionalities of the present techniques, users attempting to manually manage their platform accounts in the conventional manner may miss and/or otherwise overlook critical information associated to certain parent folders that may result in the users erroneously removing themselves from the collaborator list of parent folders and deleting any corresponding downloaded contents of those folders without any option to rejoin.

Accordingly, conventional systems consistently fail to provide any manner in which to easily organize and/or optimize a platform account, but the techniques of the present disclosure solve these issues through the highly efficient and user-friendly displays and searches of non-actioned and actioned parent folders that enable a user to quickly and easily evaluate whether or not the user should remain as a collaborator for a parent folder, whether or not the user should maintain the data corresponding to the parent folder, and whether or not the user should rejoin any parent folders the user has previously left.

Aspects of the Disclosure

1. A method for organizing and optimizing storage capacity of shared file platforms, the method comprising: pulling, by one or more processors, a set of events associated with a user from an event log, wherein each event in the set of events includes a respective parent folder identification (ID); analyzing, by a search engine utilizing the respective parent folder IDs, the set of events to determine one or more actioned parent folders corresponding to the set of events; comparing, by the one or more processors, the one or more actioned parent folders to a list of parent folders associated with the user to determine a non-actioned parent folder; displaying, at a user interface of a user computing device, the non-actioned parent folder to the user; receiving, by the one or more processors, an input from the user indicating a removal request corresponding to the non-actioned parent folder; and removing, by the one or more processors, the user from a collaborator list associated with the non-actioned parent folder.

2. The method of aspect 1, further comprising: analyzing, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

3. The method of any of aspects 1-2, wherein the non-actioned parent folder comprises a set of non-actioned parent folders, and the method further comprises: automatically sorting, by the one or more processors, the set of non-actioned parent folders based on a respective most recent event associated with each respective non-actioned parent folder; and displaying, at the user interface, the sorted set of non-actioned parent folders.

4. The method of any of aspects 1-3, wherein the non-actioned parent folder comprises a set of non-actioned parent folders, and the method further comprises: providing, by the one or more processors, a non-actioned folder search option configured to enable the user to search the set of non-actioned parent folders based on at least one of: (i) a non-actioned folder owner, (ii) non-actioned folder name, or (iii) a most recent event.

5. The method of any of aspects 1-4, further comprising: removing, by the one or more processors, the user from the collaborator list associated with the non-actioned parent folder and the non-actioned parent folder from a hard drive of the user computing device.

6. The method of any of aspects 1-5, further comprising: receiving, by the one or more processors, a rejoin request from the user corresponding to the non-actioned parent folder; determining, by the one or more processors, whether or not the rejoin request was received within an automatic rejoin period; and responsive to determining that the rejoin request was received within the automatic rejoin period, automatically adding, by the one or more processors, the user to the collaborator list associated with the non-actioned parent folder.

7. The method of aspect 6, further comprising: responsive to determining that the rejoin request was not received within the automatic rejoin period, generating, by the one or more processors, an owner rejoin request; automatically transmitting, by the one or more processors, the owner rejoin request to an owner of the non-actioned parent folder; receiving, by the one or more processors, a rejoin input from the owner of the non-actioned parent folder in response to the owner rejoin request; and adding, by the one or more processors, the user to the collaborator list associated with the non-actioned parent folder.

8. The method of any of aspects 1-7, further comprising: determining, by the one or more processors, an owner of the non-actioned parent folder; and displaying, at the user interface, the owner of the non-actioned parent folder.

9. A system for organizing and optimizing storage capacity of shared file platforms, the system comprising: a user interface; a memory storing a set of computer-readable instructions comprising at least a search engine; and a processor interfacing with the memory, and configured to execute the set of computer-readable instructions to cause the processor to: pull a set of events associated with a user from an event log, wherein each event in the set of events includes a respective parent folder identification (ID), analyze, by the search engine utilizing the respective parent folder IDs, the set of events to determine one or more actioned parent folders corresponding to the set of events, compare the one or more actioned parent folders to a list of parent folders associated with the user to determine a non-actioned parent folder, display, at the user interface, the non-actioned parent folder to the user, receive an input from the user indicating a removal request corresponding to the non-actioned parent folder, and remove the user from a collaborator list associated with the non-actioned parent folder.

10. The system of aspect 9, wherein the set of computer-readable instructions, when executed, further cause the processor to: analyze, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

11. The system of any of aspects 9-10, wherein the non-actioned parent folder comprises a set of non-actioned parent folders, and the set of computer-readable instructions, when executed, further cause the processor to: automatically sort the set of non-actioned parent folders based on a respective most recent event associated with each respective non-actioned parent folder, and display, at the user interface, the sorted set of non-actioned parent folders.

12. The system of any of aspects 9-11, wherein the non-actioned parent folder comprises a set of non-actioned parent folders, and the set of computer-readable instructions, when executed, further cause the processor to: provide a non-actioned folder search option configured to enable the user to search the set of non-actioned parent folders based on at least one of: (i) a non-actioned folder owner, (ii) non-actioned folder name, or (iii) a most recent event.

13. The system of any of aspects 9-12, wherein the set of computer-readable instructions, when executed, further cause the processor to: remove the user from the collaborator list associated with the non-actioned parent folder and the non-actioned parent folder from a hard drive of a user computing device.

14. The system of any of aspects 9-13, wherein the set of computer-readable instructions, when executed, further cause the processor to: receive a rejoin request from the user corresponding to the non-actioned parent folder, determine whether or not the rejoin request was received within an automatic rejoin period, and responsive to determining that the rejoin request was received within the automatic rejoin period, automatically add the user to the collaborator list associated with the non-actioned parent folder.

15. The system of any of aspects 9-14, wherein the set of computer-readable instructions, when executed, further cause the processor to: responsive to determining that the rejoin request was not received within the automatic rejoin period, generate an owner rejoin request, automatically transmit the owner rejoin request to an owner of the non-actioned parent folder, receive a rejoin input from the owner of the non-actioned parent folder in response to the owner rejoin request, and add the user to the collaborator list associated with the non-actioned parent folder.

16. A non-transitory computer-readable storage medium having stored thereon a set of instructions, executable by at least one processor, for organizing and optimizing storage capacity of shared file platforms, the instructions comprising: instructions for pulling a set of events associated with a user from an event log, wherein each event in the set of events includes a respective parent folder identification (ID); instructions for analyzing, by a search engine utilizing the respective parent folder IDs, the set of events to determine one or more actioned parent folders corresponding to the set of events; instructions for comparing the one or more actioned parent folders to a list of parent folders associated with the user to determine a non-actioned parent folder; instructions for displaying, at a user interface of a user computing device, the non-actioned parent folder to the user; instructions for receiving an input from the user indicating a removal request corresponding to the non-actioned parent folder; and instructions for removing the user from a collaborator list associated with the non-actioned parent folder.

17. The non-transitory computer-readable storage medium of aspect 16, wherein the instructions further comprise: instructions for analyzing, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

18. The non-transitory computer-readable storage medium of any of aspects 16-17, wherein the non-actioned parent folder comprises a set of non-actioned parent folders, and the instructions further comprise: instructions for automatically sorting the set of non-actioned parent folders based on a respective most recent event associated with each respective non-actioned parent folder; and instructions for displaying, at the user interface, the sorted set of non-actioned parent folders.

19. The non-transitory computer-readable storage medium of any of aspects 16-18, wherein the non-actioned parent folder comprises a set of non-actioned parent folders, and the instructions further comprise: instructions for providing a non-actioned folder search option configured to enable the user to search the set of non-actioned parent folders based on at least one of: (i) a non-actioned folder owner, (ii) non-actioned folder name, or (iii) a most recent event.

20. The non-transitory computer-readable storage medium of any of aspects 16-19, wherein the instructions further comprise: instructions for removing the user from the collaborator list associated with the non-actioned parent folder and the non-actioned parent folder from a hard drive of the user computing device.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although user operations of one or more methods are illustrated and described as separate operations, one or more of the user operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for organizing and optimizing storage capacity of shared file platforms, the method comprising:
   pulling, by one or more processors, a set of events associated with a user from an event log, wherein each event in the set of events includes (i) a respective parent folder identification (ID) and (ii) an occurrence date;
   analyzing, by a search engine utilizing the respective parent folder IDs and the occurrence dates, the set of events to determine one or more actioned parent folders that correspond to at least one event from the set of events having a respective occurrence date that satisfies a time threshold relative to a current date;
   automatically comparing, by the one or more processors, the one or more actioned parent folders to a list of parent folders associated with the user to determine a non-actioned parent folder, wherein the user is included on a collaborator list of the non-actioned parent folder;
   displaying, at a user interface of a user computing device, the non-actioned parent folder to the user;
   receiving, by the one or more processors, an input from the user indicating a removal request corresponding to the non-actioned parent folder;
   automatically removing, by the one or more processors, the user from the collaborator list of the non-actioned parent folder;
   receiving, by the one or more processors, a rejoin request from the user corresponding to the non-actioned parent folder;
   determining, by the one or more processors, whether or not the rejoin request was received within an automatic rejoin period; and
   responsive to determining that the rejoin request was received within the automatic rejoin period, automatically adding, by the one or more processors, the user to the collaborator list associated with the non-actioned parent folder.

2. The method of claim 1, further comprising:
   analyzing, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

3. The method of claim 1, wherein the non-actioned parent folder comprises a set of non-actioned parent folders, and the method further comprises:
   automatically sorting, by the one or more processors, the set of non-actioned parent folders based on a respective most recent event associated with each respective non-actioned parent folder; and
   displaying, at the user interface, the sorted set of non-actioned parent folders.

4. The method of claim 1, wherein the non-actioned parent folder comprises a set of non-actioned parent folders, and the method further comprises:
   providing, by the one or more processors, a non-actioned folder search option configured to enable the user to search the set of non-actioned parent folders based on at least one of: (i) a non-actioned folder owner, (ii) non-actioned folder name, or (iii) a most recent event.

5. The method of claim 1, further comprising:
   removing, by the one or more processors, the user from the collaborator list associated with the non-actioned parent folder and the non-actioned parent folder from a hard drive of the user computing device.

6. The method of claim 1, further comprising:
   responsive to determining that the rejoin request was not received within the automatic rejoin period, generating, by the one or more processors, an owner rejoin request; and
   automatically transmitting, by the one or more processors, the owner rejoin request to an owner of the non-actioned parent folder.

7. The method of claim 6, further comprising:
   receiving, by the one or more processors, a rejoin input from the owner of the non-actioned parent folder in response to the owner rejoin request; and
   adding, by the one or more processors, the user to the collaborator list associated with the non-actioned parent folder.

8. The method of claim 1, further comprising:
   determining, by the one or more processors, an owner of the non-actioned parent folder; and
   displaying, at the user interface, the owner of the non-actioned parent folder.

9. A system for organizing and optimizing storage capacity of shared file platforms, the system comprising:
  a user interface;
  a memory storing a set of computer-readable instructions comprising at least a search engine; and
  a processor interfacing with the memory, and configured to execute the set of computer-readable instructions to cause the processor to:
    pull a set of events associated with a user from an event log, wherein each event in the set of events includes (i) a respective parent folder identification (ID) and (ii) an occurrence date,
    automatically analyze, by the search engine utilizing the respective parent folder IDs and the occurrence dates, the set of events to determine one or more actioned parent folders that correspond to at least one event from the set of events having a respective occurrence date that satisfies a time threshold relative to a current date,
    automatically compare the one or more actioned parent folders to a list of parent folders associated with the user to determine a non-actioned parent folder, wherein the user is included on a collaborator list of the non-actioned parent folder,
    display, at the user interface, the non-actioned parent folder to the user,
    receive an input from the user indicating a removal request corresponding to the non-actioned parent folder,
    automatically remove the user from the collaborator list of the non-actioned parent folder,
    receive a rejoin request from the user corresponding to the non-actioned parent folder,
    determine whether or not the rejoin request was received within an automatic rejoin period, and
    responsive to determining that the rejoin request was received within the automatic rejoin period, automatically add the user to the collaborator list associated with the non-actioned parent folder.

10. The system of claim 9, wherein the set of computer-readable instructions, when executed, further cause the processor to:
  analyze, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

11. The system of claim 9, wherein the non-actioned parent folder comprises a set of non-actioned parent folders, and the set of computer-readable instructions, when executed, further cause the processor to:
  automatically sort the set of non-actioned parent folders based on a respective most recent event associated with each respective non-actioned parent folder, and
  display, at the user interface, the sorted set of non-actioned parent folders.

12. The system of claim 9, wherein the non-actioned parent folder comprises a set of non-actioned parent folders, and the set of computer-readable instructions, when executed, further cause the processor to:
  provide a non-actioned folder search option configured to enable the user to search the set of non-actioned parent folders based on at least one of: (i) a non-actioned folder owner, (ii) non-actioned folder name, or (iii) a most recent event.

13. The system of claim 9, wherein the set of computer-readable instructions, when executed, further cause the processor to:
  remove the user from the collaborator list associated with the non-actioned parent folder and the non-actioned parent folder from a hard drive of a user computing device.

14. The system of claim 9, wherein the set of computer-readable instructions, when executed, further cause the processor to:
  responsive to determining that the rejoin request was not received within the automatic rejoin period, generate an owner rejoin request,
  automatically transmit the owner rejoin request to an owner of the non-actioned parent folder.

15. The system of claim 14, wherein the set of computer-readable instructions, when executed, further cause the processor to:
  receive a rejoin input from the owner of the non-actioned parent folder in response to the owner rejoin request, and add the user to the collaborator list associated with the non-actioned parent folder.

16. A non-transitory computer-readable storage medium having stored thereon a set of instructions, executable by at least one processor, for organizing and optimizing storage capacity of shared file platforms, the instructions comprising:
  instructions for pulling a set of events associated with a user from an event log, wherein each event in the set of events includes (i) a respective parent folder identification (ID) and (ii) an occurrence date;
  instructions for automatically analyzing, by a search engine utilizing the respective parent folder IDs and the occurrence dates, the set of events to determine one or more actioned parent folders that correspond to at least one event from the set of events having a respective occurrence date that satisfies a time threshold relative to a current date;
  instructions for automatically comparing the one or more actioned parent folders to a list of parent folders associated with the user to determine a non-actioned parent folder, wherein the user is included on a collaborator list of the non-actioned parent folder;
  instructions for displaying, at a user interface of a user computing device, the non-actioned parent folder to the user;
  instructions for receiving an input from the user indicating a removal request corresponding to the non-actioned parent folder;
  instructions for automatically removing the user from the collaborator list of the non-actioned parent folder;
  instructions for receiving a rejoin request from the user corresponding to the non-actioned parent folder;
  instructions for determining whether or not the rejoin request was received within an automatic rejoin period; and
  responsive to determining that the rejoin request was received within the automatic rejoin period, instructions for automatically adding the user to the collaborator list associated with the non-actioned parent folder.

17. The non-transitory computer-readable storage medium of claim 16, wherein the instructions further comprise:
  instructions for analyzing, by the search engine utilizing the respective parent folder IDs, the set of events at a first time to determine one or more actioned parent folders corresponding to the set of events, wherein each actioned parent folder of the one or more actioned parent folders corresponds to an event that occurred within 13 months of the first time.

18. The non-transitory computer-readable storage medium of claim 16, wherein the non-actioned parent folder comprises a set of non-actioned parent folders, and the instructions further comprise:
   instructions for automatically sorting the set of non-actioned parent folders based on a respective most recent event associated with each respective non-actioned parent folder, and
   instructions for displaying, at the user interface, the sorted set of non-actioned parent folders.

19. The non-transitory computer-readable storage medium of claim 16, wherein the non-actioned parent folder comprises a set of non-actioned parent folders, and the instructions further comprise:
   instructions for providing a non-actioned folder search option configured to enable the user to search the set of non-actioned parent folders based on at least one of: (i) a non-actioned folder owner, (ii) non-actioned folder name, or (iii) a most recent event.

20. The non-transitory computer-readable storage medium of claim 16, wherein the instructions further comprise:
   instructions for removing the user from the collaborator list associated with the non-actioned parent folder and the non-actioned parent folder from a hard drive of the user computing device.

\* \* \* \* \*